United States Patent

[11] 3,612,136

| [72] | Inventor | Vernon E. Gough<br>Croyde, near Braunton, North Devon, England |
|---|---|---|
| [21] | Appl. No. | 831,434 |
| [22] | Filed | June 9, 1969 |
| [45] | Patented | Oct. 12, 1971 |
| [73] | Assignee | Dunlop Holdings Limited<br>London, England |
| [32] | Priority | June 20, 1968 |
| [33] | | Great Britain |
| [31] | | 29423/68 |

[54] PNEUMATIC TIRES
18 Claims, 2 Drawing Figs.

[52] U.S. Cl. .................................................. 152/361
[51] Int. Cl. .................................................. B60c 9/18
[50] Field of Search............................................ 152/361

[56] References Cited
UNITED STATES PATENTS

| Re. 26,713 | 11/1969 | Mirtain et al. | 152/361 X |
|---|---|---|---|
| 2,982,328 | 5/1961 | Emanueli | 152/361 |
| 2,984,282 | 5/1961 | Vittorelli | 152/361 |
| 3,131,744 | 5/1964 | Boussu et al. | 152/361 |
| 3,395,745 | 8/1968 | Massoubre | 152/361 |

FOREIGN PATENTS

| 770,315 | 3/1957 | Great Britain | 152/361 |

Primary Examiner—Arthur L. La Point
Assistant Examiner—George H. Libman
Attorney—Stevens, Davis, Miller & Mosher ABSTRACT: A pneumatic tire provided with a breaker assembly of at least one composite breaker layer, each composite breaker layer comprising at least two narrow breaker layers of cord fabric, the cords of each narrow breaker being substantially rectilinear, the narrow breaker layers each being substantially narrower than the total tread width and being arranged in radially spaced apart and partially overlapping relationship, a layer of rubber or rubberlike material being interposed between the overlapping portions thereof, the overall axial extent of each composite breaker layer being substantially equal to the total tread width.

PNEUMATIC TIRES

This invention relates to a pneumatic tire construction incorporating a breaker assembly comprising a plurality of breaker plies located in between the tread portion of a tire and the radially outermost carcass ply thereof.

In known constructions, tire breaker assemblies have in general comprised breaker layers wherein the width of each breaker layer has been substantially equal in width to, or wider than, the tread width. However, such known constructions suffer from the disadvantage that a substantial amount of vibration generated by engagement of the ground-contacting surface of the tire with the surface upon which the tire is running, is transmitted to the vehicle upon which the tire is mounted via the breaker assembly and carcass of the tire and into the wheel upon which the tire is mounted resulting in unwanted audible vibration in the said vehicle.

In addition, known constructions incorporating a breaker assembly comprising equally inclined crossed plies generate a self-aligning torque when rolling in a straight line owing to the unequal distances of the component breaker plies of the breaker assembly with respect to the ground-contacting portion of the tread.

It is an object of the present invention to eliminate or substantially reduce either or both of the aforementioned disadvantages.

According to the present invention a pneumatic tire is provided with a breaker assembly of one or more composite breaker layers, each composite breaker layer comprising at least two narrow breaker layers of cord fabric, the cords of each narrow breaker layer being substantially rectilinear, the narrow breaker layers each being substantially narrower than the total tread width, and being arranged in radially spaced apart and partially overlapping relationship, a layer of rubber or rubberlike material being interposed between the overlapping portions thereof, the overall axial extent of each composite breaker layer being substantially equal to the total tread width.

The term "narrow breaker layer" will be used hereinafter to describe breaker layers as referred to in the preceding paragraph wherein the width thereof is substantially less than that of the total thread width.

Preferably the breaker assembly is provided with at least one full width breaker layer, the width thereof being substantially equal to the total tread width.

The breaker assembly may comprise one or more composite breaker layers, each layer comprising two, three, four or more partially overlapping narrow breaker layers, said narrow layers each extending around the entire tire circumference and the overlaps being disposed circumferentially.

Preferably the cords of one layer of each pair of narrow breaker layers are substantially equally inclined with respect to the midcircumferential plane of the tire as the cords of the other layer thereof and are disposed in the same sense (the difference in inclination preferably being not greater than 5°).

Alternatively, the cords of one layer of each pair of narrow breaker layers cross the cords of the other layer thereof, the difference between the angle of inclination of each set of cords with respect to the midcircumferential plane of the tire preferably being not greater than 5°.

In some constructions however an inclination difference in the above-mentioned cross-cord type of construction of substantially greater than 5° may be employed to some advantage.

Said narrow layers may comprise cords of a different type of material from that employed in the construction of the full width breaker layers and may for example comprise rayon, nylon, polyester, glass or steel material.

In addition, the cords of each narrow layer may be of a different type of material from that of the other narrow layers and/or may comprise cord material of different modulus of elasticity or gauge. Said cords may also be present in greater numbers than those of the other narrow layers.

The said interposed layer of rubber or rubberlike material is preferably less hard than the tread rubber surrounding it and may be for example up to 10° B.S. less hard.

The said interposed layer of rubber or rubberlike material may extend to a distance of up to 2 mm. radially outwardly and/or radially inwardly of the overlapping portions of the pair or pairs of "narrow breaker layers" and may extend axially outwardly of the overlapping portions of the pair or pairs of "narrow breaker layers" to the extent of between 3 and 10 mm.

Preferably the narrow breaker layers are wider than half the total tread width.

In addition, it is preferable that said narrow layers are disposed alternatively on either side of the midcircumferential plane of the tire.

In addition, the width of each of said narrow layers may not be equal but preferably the circumferential plane of symmetry of said overlapping portions of said narrow breaker layers is axially offset not more than 20 mm. from the midcircumferential plane of the tire.

Preferably the said narrow breaker layers overlap in a band of uniform width, the width of which lies within the range 5 to 25 mm.

Two embodiments of the invention will now be described in more detail by way of example with reference to the accompanying drawings wherein.

Figure 1:
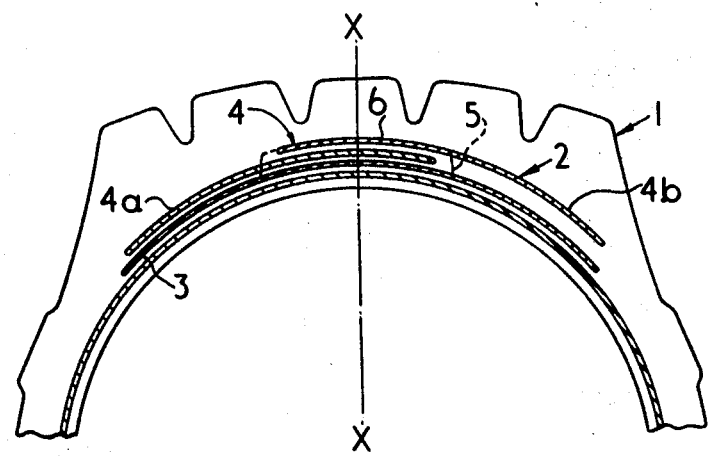
FIG. 1 illustrates a fragmentary diagrammatic cross-sectional view of a pneumatic tire according to the first embodiment of the invention.

In the first embodiment of the invention shown in FIG. 1 a breaker assembly 2 for a motor car pneumatic tire of size 165-14 comprises two breaker layers 3 and 4 of rayon cord fabric. The radially innermost breaker layer 3 is a full width breaker layer, i.e., it is of substantially the same width as that of the tire tread 1. The radially outer breaker layer 4 is a composite breaker layer comprising two narrow breaker layers 4a and 4b each of width 3⅛ inches which overlap in the crown region of the breaker assembly 2 to the extent of 10 mm. The circumferential plane of symmetry of the overlapping portion of the narrow breaker layers 4a and 4b is disposed substantially in the midcircumferential plane "X—X" of the tire. Between the circumferentially extending overlapping region 6 of the narrow breaker layers 4 is located a cushion 5 of rubber of hardness 55° B.S.

The rubber of the tire tread 1 is of hardness 65° B.S. Said cushion rubber extends radially inwardly of said region 6 as far as the full width breaker layer 3, a distance of 2 mm. and the cushion rubber also extends 10 mm. generally axially outwardly of each side of said overlapping region 6. The cords of the narrow breaker layers 4a and 4b are inclined equally in the same sense at an angle of 20°, with respect to the midcircumferential plan "X—X" of the tire.

Figure 2:
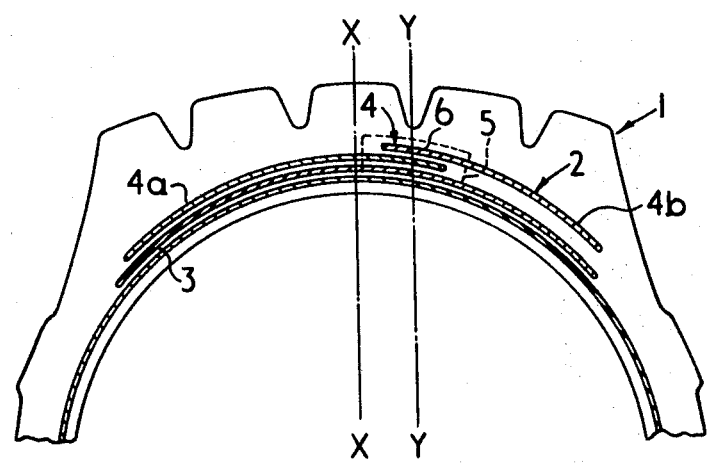
FIG. 2 illustrates a fragmentary diagrammatic cross-sectional view according to the second embodiment of the invention.

In the second embodiment of the invention shown in FIG. 2 a motor car pneumatic tire of size 165–14 is provided with a breaker assembly 2 comprising two breaker layers 3 and 4 of rubberized rayon cord fabric.

The radially innermost breaker layer 3 is a full width breaker layer of substantially the same width as that of the tire tread 1, i.e., 4½ inches. The radially outermost breaker layer 4 is a composite breaker layer comprising two narrow breaker layers 4a and 4b of unequal width which overlap substantially in the crown region of the breaker assembly to the extent of 10 mm. The width of one narrow breaker layers is 3⅜ inches and the other is 1⅞ inches. The circumferential plane of symmetry "Y—Y" of the overlapping portions 6 of the narrow breaker layers 4a and 4b is axially offset by a distance of 20 mm. from the midcircumferential plane "X—X" of the tire.

Between the circumferentially extending, overlapping region 6 of the breaker layers 4a and 4b is located a cushion of rubber 5 of hardness 55° B.S. The rubber of the tread is of hardness 65° B.S. Said rubber extends radially outwardly and radially inwardly of the said overlapping region of the narrow breaker layers to the extent of 2 mm. The said rubber cushion 5 also extends 10 mm. generally axially outwardly of each side of the said overlapping region 6.

The cords of the narrow breaker layers are inclined equally in the same sense with respect to the midcircumferential plane "X—X" of the tire at an angle of 20°. The cords of the full width breaker layer 3 are also inclined at an angle of 20°, but in an opposite sense to those of the narrow breaker layers 4a and 4b with respect to the midcircumferential plane "X—X" of the tire.

In a first modification of either of the embodiments the cords of the narrow breaker layers 4a and 4b are inclined in an opposite sense to one another so as to cross in the overlapping region 6 thereof, each breaker layer 4a and 4b being equally inclined at an angle of 20° with respect to the midcircumferential plane "X—X" of the tire.

In a second modification of either of the embodiments the cords of the narrow breaker layers are inclined unequally, the angular difference between the cords of the narrow breaker layers 4a and 4b being not greater than 5°.

In a third modification of either of the embodiments the cords of the narrow breaker layers are inclined the radially narrow breaker layers 4a and 4b are inclined in the same or opposite sense and in either case the angular difference between the cords of each narrow breaker layer is substantially greater than 5° and may be as large as 60°.

The tires in the second embodiment of the invention and the second and third modifications of either of the embodiments of the invention hereinbefore described are of advantage in that they enable construction of a tire with overall asymmetric properties. Such tires are particularly desirable in that they improve the cornering characteristics of a tire.

Having now described my invention what I claim is:

1. A pneumatic tire provided with a breaker assembly of at least one composite breaker layer, comprising at least two narrow breaker layers of rubberized cord fabric, the cords of each narrow breaker layer being substantially rectilinear, the narrow breaker layers each being substantially narrower than the total tread width and being arranged in radially spaced apart and partially overlapping relationship, and there being interposed only in the area of the overlapping portions of said layers of rubberized cord fabric a layer of rubber having a hardness lower than that of the surrounding tread rubber, the overall axial extent of each composite breaker layer being substantially equal to the total tread width.

2. A pneumatic tire according to claim 1 wherein the breaker assembly is provided with at least one full width breaker layer, the width thereof being substantially equal to the total tread width.

3. A pneumatic tire according to claim 1 wherein the cords of each pair of partially overlapping narrow breaker layers of at least one composite breaker layer are disposed in an opposite sense with respect to a circumferential line.

4. A pneumatic tire according to claim 1 wherein the cords of each pair of partially overlapping narrow breaker layers of at least one composite breaker are disposed in an opposite sense with respect to a circumferential line.

5. A pneumatic tire according to claim 3 wherein the cords of each pair of partially overlapping narrow breaker layers of at least one composite layer are inclined at a substantially different bias angle with respect to the midcircumferential plane of the tire.

6. A pneumatic tire according to claim 1 wherein the cords of at least one pair of overlapping narrow breaker layers differ substantially in modules of elasticity from the cords of a full width breaker layer, the cords of different modulus comprising the same material.

7. A pneumatic tire according to claim 1 wherein the said interposed layer is up to 10° B.S. less hard than the hardness of the tread rubber surrounding it.

8. A pneumatic tire according to claim 1 wherein the said interposed layer of rubber extends radially outwardly of the overlapping regions of the narrow breaker layers.

9. A pneumatic tire according to claim 1 wherein the said interposed layer of rubber extends radially inwardly of the overlapping regions of the narrow breaker layers.

10. A pneumatic tire according to claim 1 wherein the said interposed layer of rubber extends axially outwardly of the overlapping regions of the narrow breaker layer.

11. A pneumatic tire according to claim 1 wherein the narrow breaker layers overlap in a band of uniform width.

12. A pneumatic tire according to claim 1 wherein at least one composite breaker layer comprises two narrow breaker plies.

13. A pneumatic tire according to claim 12 wherein the circumferential plane of symmetry of the overlapping portions of the narrow layers is axially offset by not more than 20 mm. from the midcircumferential plane of the tire.

14. A pneumatic tire according to claim 12 wherein the circumferential plane of symmetry of the overlapping portions of the narrow layers lies in the midcircumferential plane of the tire.

15. A pneumatic tire according to claim 1 wherein the width of the overlapping portions of the narrow breaker layer lies within the range 5 to 25 mm.

16. A pneumatic tire according to claim 1, wherein the cords of at least one pair of overlapping narrow breaker layers differ substantially in modulus of elasticity from the cords of a full width breaker layer, the said cords of different modulus comprising different material.

17. A pneumatic tire provided with a breaker assembly of at least one composite breaker layer comprising at least two narrow breaker layers of cord fabric, the cords of each narrow breaker layer being substantially rectilinear, the narrow breaker layers each being substantially narrower than the total tread width and being arranged in radially spaced apart and partially overlapping relationship, the overall axial extent of the composite breaker layer being substantially equal to the total tread width and there being interposed only in the area of the overlapping portions thereof a layer of rubber having a hardness up to 10° B.S. lower than that of the surrounding tread rubber, said interposed layer of rubber extending radially inwardly and axially outwardly of the overlapping regions of the narrow breaker layers.

18. A pneumatic tire provided with a breaker assembly of at least one composite breaker layer, comprising at least two narrow breaker layers of cord fabric at least one having two narrow breaker plies, the cords of each narrow breaker layer being substantially rectilinear, the narrow breaker layer being substantially narrower than the total tread width and being arranged in radially spaced apart and partially overlapping relationship, the circumferential plane of symmetry of the overlapping portions of the narrow layers being axially offset by not more than 20 mm. from the midcircumferential plane of the tire, and there being interposed between the overlapping portions thereof a layer of rubber having a hardness lower than that of the surrounding tread rubber, the overall axial extent of each composite breaker layer being substantially equal to the total tread width.

Disclaimer 3,612,136.—*Vernon E. Gough*, Croyde, near Braunton, North Devon, England. PNEUMATIC TIRES. Patent dated Oct. 12, 1971. Disclaimer filed Jan. 4, 1974, by the assignee, *Dunlop Holdings, Ltd.*

Hereby enters this disclaimer to claim 4 of said patent.

[*Official Gazette April 16, 1974.*]